US012800103B2

(12) United States Patent
Sikoutris et al.

(10) Patent No.: US 12,800,103 B2
(45) Date of Patent: Nov. 17, 2026

(54) PRESSURE TANK

(71) Applicant: Cevotec GmbH, Unterhaching (DE)

(72) Inventors: Dimitrios Sikoutris, Kaufbeuren (DE); Marc Kornmesser, Erding (DE); Richard Carle, Munich (DE); Herbert Weidinger, Munich (DE)

(73) Assignee: CEVOTEC GMBH, Unterhaching (DE)

( * ) Notice: Subject to any disclaimer, the term of this patent is extended or adjusted under 35 U.S.C. 154(b) by 216 days.

(21) Appl. No.: 18/714,378

(22) PCT Filed: Nov. 28, 2022

(86) PCT No.: PCT/EP2022/083440

§ 371 (c)(1),
(2) Date: May 29, 2024

(87) PCT Pub. No.: WO2023/099388

PCT Pub. Date: Jun. 8, 2023

(65) Prior Publication Data

US 2025/0020278 A1 Jan. 16, 2025

(30) Foreign Application Priority Data

Nov. 30, 2021 (DE) ..................... 10 2021 131 449.6

(51) Int. Cl.
*F17C 1/06* (2006.01)
*F17C 13/00* (2006.01)

(52) U.S. Cl.
CPC .............. *F17C 1/06* (2013.01); *F17C 13/002* (2013.01); *F17C 2203/0604* (2013.01)

(58) Field of Classification Search
CPC ................ F17C 1/06; F17C 2201/0109; F17C 2203/0609; F17C 2203/0665;
(Continued)

(56) References Cited

U.S. PATENT DOCUMENTS 2,479,828 A 8/1949 Geckler
3,372,075 A * 3/1968 Holt .......................... F17C 3/02 428/116
(Continued)

FOREIGN PATENT DOCUMENTS

DE 102013210034 A1 12/2014
FR 3109426 A1 10/2021
(Continued)

OTHER PUBLICATIONS

International Application No. PCT/EP2022/083440, International Search Report and Written opinion, mailed Mar. 9, 2023, 6 pages.
(Continued)

*Primary Examiner* — Stephen J Castellano

(74) *Attorney, Agent, or Firm* — Kilpatrick Townsend & Stockton LLP

(57) ABSTRACT

The invention relates to a pressure tank comprising a liner which comprises a cylindrical portion and closure caps, a central axis (X) and a pole being defined on the liner, a first plurality of slivers which follow a first rotational direction with respect to the peripheral direction of the liner and a second plurality of slivers which follow a second rotational direction with respect to the peripheral direction of the liner are provided, the first plurality of slivers and the second plurality of slivers overlapping at least in part, and the first rotational direction followed by the first plurality of slivers being opposite the second rotational direction followed by the second plurality of slivers.

20 Claims, 4 Drawing Sheets

(58) Field of Classification Search
CPC .......... F17C 2203/067; F17C 2209/234; F17C 2260/011
See application file for complete search history.

(56) References Cited

U.S. PATENT DOCUMENTS

| | | | | |
|---|---|---|---|---|
| 2010/0294776 A1* | 11/2010 | Liu | F17C 1/06 | 206/0.6 |
| 2012/0273085 A1* | 11/2012 | David | D04C 1/06 | 139/387 R |
| 2012/0315569 A1* | 12/2012 | Tanigawa | B29C 70/32 | 429/515 |
| 2019/0170297 A1* | 6/2019 | Criel | F17C 1/06 | |

FOREIGN PATENT DOCUMENTS

| | | |
|---|---|---|
| KR | 101846733 B1 | 4/2018 |
| WO | 2018007367 A1 | 1/2018 |

OTHER PUBLICATIONS

German Application No. 10 2021 131 449.6, German Search Report mailed Sep. 26, 2022, 5 pages.
Leavitt et al., "Final report—Development of advanced manufacturing technologies for low cost hydrogen storage vessels", Dec. 29, 2014. 137 S., Retrieved from https://www.osti.gov/servlets/purl/1229901 [abgerufen amSep. 26, 2022], Dec. 29, 2014, 137 pages.
European Patent Application No. 22822499.4, Examination Report mailed Apr. 22, 2026, 8 pages.

* cited by examiner

PRESSURE TANK

CROSS REFERENCE TO RELATED APPLICATIONS

This application is a U.S. national phase of International Patent Application No. PCT/EP2022/083440 filed on Nov. 28, 2022, which claims priority to German Patent Application No. 10 2021 131 449.6, filed in Germany on Nov. 30, 2021. The entire contents of both applications are hereby incorporated herein by this reference.

The present invention relates to a pressure tank which is designed to store a pressurized fluid.

Pressure tanks for storing pressurized fluids, such as fuels or gases, have been widespread for many years. Precisely in view of alternative fuels, such as hydrogen, for driving vehicles, the requirements placed on pressure tanks in terms of weight, safety, and production costs are increasing. Known pressure tanks achieve a sufficient degree of safety usually only by laborious reinforcements, which significantly increase the weight and the costs of a pressure tank of this kind.

The object of the present invention is therefore that of providing a pressure tank which is better adapted to the increasing requirements, and in particular can reduce a use of material.

This object is achieved according to the invention by a pressure tank which is designed to store a pressurized fluid, comprising a liner, which comprises a substantially cylindrical portion and in each case comprises a closure cap on the axial ends thereof, a central axis being defined by the cylindrical portion, an intersection point of the central axis with a respective closure cap defining a pole of the closure cap, a first plurality of slivers being arranged on the outside of the liner, which slivers are arranged relative to one another, along a peripheral direction of the liner, in such a way that mutually adjacent slivers begin at a substantially identical longitudinal starting position, follow an identical rotational direction with respect to the peripheral direction of the liner and at a substantially identical angle with respect to the longitudinal direction of the liner, and end at a substantially identical longitudinal end position, the respective end position being located closer to a pole associated with the first plurality of slivers than the respective starting position, a second plurality of slivers being arranged on the outside of the first plurality of slivers, which slivers are arranged relative to one another, along a peripheral direction of the liner, in such a way that mutually adjacent slivers begin at a substantially identical longitudinal starting position, follow an identical rotational direction with respect to the peripheral direction of the liner and at a substantially identical angle with respect to the longitudinal direction of the liner, and end at a substantially identical longitudinal end position, the respective end position being located closer to the pole associated with the first plurality of slivers than the respective starting position, the first plurality of slivers and the second plurality of slivers overlapping at least in part, and the rotational direction followed by the first plurality of slivers being opposite the rotational direction followed by the second plurality of slivers.

It should be noted already at this point that the "associated pole" is intended to describe that pole which is arranged closer to the slivers considered in each case. Furthermore, the "longitudinal direction" is intended to describe a direction on the pressure tank which extends in parallel with the central axis of the liner. The angle at which the slivers are attached to the liner in relation to the longitudinal direction of said liner can in particular be different from 0° and/or from 90°. The expression "overlap (ping) at least in part" is intended to be understood such that a first sliver is covered, on its outer main surface, by a second sliver, in particular without penetration taking place between the two slivers and/or without entanglement occurring between adjacent slivers. In other words, the first plurality of slivers, possibly with the exception of overlap regions of adjacent slivers of the first plurality of slivers, viewed in a direction along a respective normal to the surface of the liner, can be arranged at a first distance from the surface of the liner, and the second plurality of slivers, again possibly with the exception of overlap regions of adjacent slivers of the second plurality of slivers, viewed in a direction along the same respective normal to the surface of the liner, can be arranged at a second distance from the surface of the liner, the first distance in particular being smaller than the second distance.

For example, the first plurality of slivers can be attached to the liner as a ring extending in the peripheral direction (also referred to as "base belt"), consisting of a plurality of slivers that are arranged substantially in parallel, as a result of which a surface that is substantially closed when viewed in the peripheral direction can be produced by the first plurality of slivers. In this case, the slivers can be attached to the liner at a predetermined angle to a longitudinal direction of the liner along the central axis, it being possible in particular for said angle to be substantially the same for all the slivers of the first plurality of slivers. This can result in a peripherally uniform strip pattern of oblique strips. The second plurality of slivers can now be arranged radially outside of the first plurality of slivers, which slivers of the second plurality can also be attached at a predetermined angle to the longitudinal direction of the liner and all around in the peripheral direction thereof (also referred to as "offset belt"), the angle of the slivers of the first plurality of slivers differing from the angle of the slivers of the second plurality of slivers. In particular, the angles at a respective intersection point with the same contour line of the pressure tank, i.e. at the same longitudinal position of the pressure tank, can be of the same magnitude but different in sign with respect to a longitudinal direction of the liner, for example +30° and −30°. Due to the arrangement of the second plurality of slivers on the first plurality of slivers, in turn a surface that is substantially closed when viewed in the peripheral direction can be created by the second plurality of slivers, which surface externally covers the surface created by the first plurality of slivers, in particular to at least 90%.

Using a superimposition of the second plurality of slivers radially outside of the first plurality of slivers makes it possible for a non-symmetrical arrangement of the slivers of the first plurality of slivers relative to the slivers of the second plurality of slivers to be achieved, since in the case of such a superimposition the first and second plurality of slivers are arranged at different radial distances from the central axis of the liner.

The arrangement according to the invention of the first plurality of slivers and the second plurality of slivers on the liner makes it possible for a systematic undulation of the reinforcing layer formed by the slivers to be reduced, in particular largely prevented. Thus, substantially all the applied slivers, i.e. all the load-bearing fiber material applied on the liner, are loaded closer to the theoretical maximum load of the basic material.

The arrangement, intersecting when viewed in the radial direction, of overlapping slivers makes it possible for the liner to be reinforced uniformly, such that a load which acts on the liner can be absorbed uniformly. In technical terms, it can also be referred to as what is known as a "balanced laminate", when for each layer of slivers having a first arrangement angle relative to the central axis of the liner a second layer of slivers having a second arrangement angle relative to the central axis of the liner, which is of the same magnitude as and an opposite sign from the first arrangement angle, is arranged.

The stripwise application of the slivers can, in contrast to conventional wrapping of the liner with fiber material, make it possible to prevent unnecessary overlaps and thus save fiber material overall.

The slivers can comprise a plurality of individual fibers or of individual fiber bundles. Advantageously, a subgroup of the plurality of individual fibers or of individual fiber bundles can extend substantially in parallel with a longitudinal extension direction of the sliver, the longitudinal extension direction being intended to refer, for example, to the direction in which the length of an elongate sliver extends with a greater length than width. For the event that a sliver is intended to have a length that extends curved, the longitudinal extension direction can also extend curved.

In a development of the present invention, the longitudinal starting position at which the first plurality of slivers begins can be arranged in the region of the cylindrical portion of the liner. Thus, the slivers of the first plurality of slivers can extend from the cylindrical portion of the liner, beyond a transition region between the cylindrical portion and closure cap, into the region of the closure cap. Since the region of the closure caps and a corresponding transition region to the cylindrical portion are usually much less resistant to loading than the cylindrical portion of the liner, these regions can be purposely reinforced by such an arrangement of the slivers of the first plurality of slivers.

Furthermore, the longitudinal starting position at which the second plurality of slivers begins can be closer to the pole associated with the first plurality of slivers than the longitudinal starting position of the first plurality of slivers. Thus, a ring extending in the peripheral direction of the liner, which ring interconnects the starting positions of the slivers of the second plurality of slivers, can be at a smaller longitudinal distance or a smaller distance along the meridian direction of the closure cap from the associated pole than a ring extending in the peripheral direction of the liner, which ring interconnects the starting positions of the slivers of the first plurality of slivers. In this way, load concentrations on account of stiffness changes in the layers of slivers can be reduced or even prevented.

In this case, the longitudinal offset by which the longitudinal starting position at which the second plurality of slivers begins is closer to the pole associated with the first plurality of slivers than the starting position of the first plurality of slivers can substantially correspond to a width or half a length of a sliver of the first plurality of slivers. This makes it possible to prevent the starting positions of the slivers of the first and second plurality of slivers, viewed in the radial direction (i.e. in a direction along a respective normal to the surface of the liner), from overlapping, such that this can again achieve a uniform reinforcement of the liner by the slivers.

Advantageously, a length of the slivers of the first plurality of slivers can be substantially the same as a length of the slivers of the second plurality of slivers. Of course, it is also conceivable that all the dimensions of the slivers of the first plurality of slivers can be substantially the same as the dimensions of the slivers of the second plurality of slivers.

A respective following sliver can be arranged at the end position of at least one of the slivers of the first and/or second plurality of slivers, it being possible for the width of the following sliver to differ from the width of the preceding sliver. An above-mentioned "following sliver" can be arranged closer to an associated pole than an above-mentioned "preceding sliver." In this case, a following sliver can be arranged largely separately from a preceding sliver, possibly with the exception of overlapping regions in the sense of a transition from a preceding sliver to a following sliver. These overlapping regions between the preceding sliver and following sliver can be less than 10%, in particular less than 5%, of the total surface area of a sliver.

In this connection, the number of following slivers, viewed in the peripheral direction of the pressure tank, can be smaller than the number, again viewed in the peripheral direction of the pressure tank, of the preceding slivers. A smaller width of following slivers may be advantageous in particular at regions of the pressure tank at which a surface to be covered reduces, for example tapering off to a respective pole at the closure caps, in order to be able to reduce or prevent undesired overlap regions between adjacent slivers. Of course, the width of the following sliver can also be greater than the width of the preceding sliver. Increasing a width of a following sliver may make it possible, in particular at regions of the pressure tank at which a surface to be covered increases or at least remains substantially the same, for a number of following slivers, which are arranged in a row in the peripheral direction of the liner and thus form a ring, to be smaller than a number of preceding slivers, again viewed on a ring of preceding slivers formed in the peripheral direction of the liner.

A longitudinal extension direction of the following sliver can in particular be angled relative to a longitudinal extension direction of a respective preceding sliver. That is to say that, in contrast to a continuous fiber strip, which is deposited continuously on a respective closure cap, in this case successive slivers can have a "kink" (a sudden change in direction of the course of successive slivers) in their transition to one another. In particular when using elongate slivers, i.e. slivers which comprise two longer outside edges and at least two shorter outside edges, a respective longitudinal extension direction can extend in parallel with at least one of the longer outside edges. The angled arrangement of the following sliver relative to a respective preceding sliver makes it possible for each individual sliver to be aligned in an optimized manner in accordance with the curvature of the closure cap, as a result of which better use can be made of a respective sliver along its direction of maximum bearing load.

With respect to a transition of a preceding sliver to a following sliver, the following sliver and a respective preceding sliver can be arranged relative to one another in such a way that an outside edge of the following sliver intersects with an outside edge of the respective preceding sliver, an intersection point at which the two outside edges intersect being located both on a center in the width direction of the following sliver and on a center in the width direction of the preceding sliver. In other words, the two slivers can be arranged overlapping one another, for example with one of the shorter outside edges in each case, in such a way that a longitudinal center line of the preceding sliver, at its outside edge, meets a longitudinal central line of the following sliver, at its outside edge.

Furthermore, with respect to a transition of this kind, it is conceivable that the following sliver and a respective preceding sliver can be arranged relative to one another in such a way that an outside edge of the following sliver intersects with an outside edge of the respective preceding sliver, an intersection point at which the two outside edges intersect being located both at an end of the outside edge of the following sliver and at an end of the outside edge of the preceding sliver. That is to say that a corner of the preceding sliver is arranged superimposed on a corner of the following sliver.

In possible embodiments of the present invention, at least one sliver of the first and/or second plurality of slivers can have a trapezoidal basic shape. A trapezoidal basic shape can for example be described in that one of the two longer outside edges of a sliver is shorter than the other longer outside edge of said sliver. Due to the trapezoidal basic shape, successive slivers in the longitudinal extension direction can be lined up "edge to edge," i.e. without substantial overlap, and at the same time a sudden change in direction of the course of the slivers lined up in the longitudinal extension direction can be achieved.

For this purpose, it is possible that the trapezoidal basic shape of at least one sliver can be designed in such a way that an axis, which is defined by those outside edges at which a preceding sliver and a sliver following this are aligned relative to one another, in particular at which a preceding sliver and a sliver following this come into contact, bisects an angle of a longitudinal extension direction of the following sliver to a longitudinal extension direction of a respective preceding sliver. It is thus possible to determine, for example on the basis of planning carried out before the production of a pressure tank according to the invention, the angle at which two successive slivers in the longitudinal extension direction should be arranged, it being possible for an angle bisector to be determined for said angle, according to which bisector corresponding slivers are to be cut to a trapezoidal basic shape. Of course, it is also conceivable that the abutting edge of the two successive slivers does not bisect the angle, or even that only one of the slivers has a trapezoidal basic shape and the other is substantially rectangular (at least at the side at which the trapezoidal sliver is placed).

In this case, a preceding sliver and a sliver following this can be taken from mutually adjoining portions of a sliver starting material originally produced in one piece. For example, a long fiber strip, which is of a significantly greater length than respective slivers, can be divided into at least two slivers, in particular a plurality of slivers. In this case, a division of the fiber strip into two slivers can take place using a cutting line which extends obliquely, in particular non-orthogonally, to a longitudinal extension direction of the fiber strip. If said intersection line now extends at an angle to the longitudinal extension direction of the fiber strip which corresponds to half of the angle at which the longitudinal extension directions of a preceding and a following sliver are intended to be arranged relative to one another, then the slivers cut from the fiber strip in this way can be easily placed against one another in that one of the slivers is applied to the liner "upside down", "upside down" being intended to mean in this case that, assuming that, on the fiber strip, one of the two main surfaces of the fiber strip is defined as the "top" and the other of the two main surfaces of the fiber strip is defined as the "bottom", one out of the preceding sliver and the following sliver is applied to the liner by its "top", and the other, respectively, out of the preceding sliver and the following sliver is applied to the liner by its "bottom". An arrangement of this kind may be visible on a finished pressure tank in particular on account of the course of the individual fibers of a respective sliver and their interruption at a respective outside edge of the sliver.

The above-mentioned planning of the arrangement of the slivers on the liner and a resulting cutting of the slivers makes it possible to achieve overlap-free and/or gap-free lining up of slivers. Furthermore, waste when dividing a fiber strip into individual slivers can be reduced or even prevented.

At least one of the slivers, in particular all the slivers, can comprise carbon fibers and/or aramid and/or glass and/or polyethylene, in particular UHMWPE, and/or basalt. It is also conceivable that a preceding sliver and a sliver following this in the longitudinal extension direction may comprise different materials. In this way, it is possible to react specifically to explicit load situations in certain regions of the pressure tank.

In order to further reinforce the arrangement of the slivers on the liner, at least one of the slivers, in particular all the slivers, can be pre-impregnated with a matrix material, in particular a resin, which connects fibers of a respective sliver, or is impregnated by said matrix material after being arranged on the liner. Thus, a respective sliver can first be adjusted to the surface of the liner or to the surface of the slivers already arranged on the liner, and can subsequently harden in this position.

The invention will be described in greater detail in the following on the basis of embodiments with reference to the accompanying drawings, in which.

Figure 1:
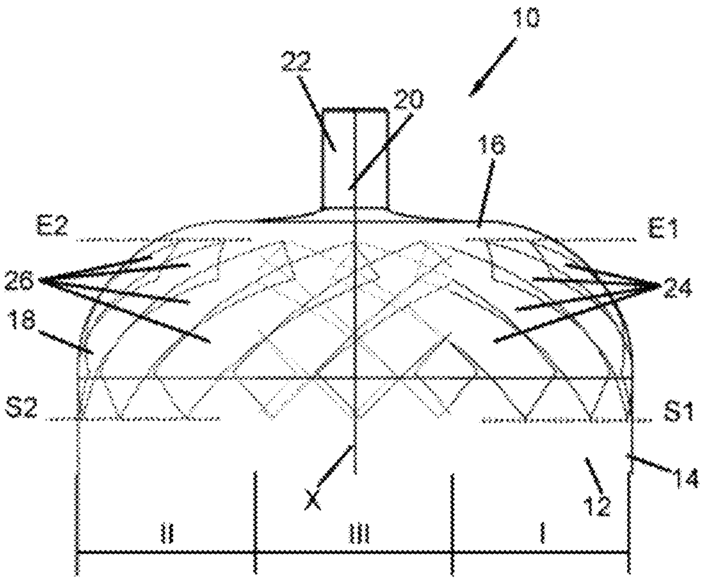
FIG. 1 is a partial side view of a pressure tank according to the invention.

In FIG. 1 a pressure tank according to the invention is denoted generally by reference sign 10. The pressure tank 10 comprises a liner 12, which in turn comprises a cylindrical portion 14 and closure caps 16 (of which only one is shown in FIG. 1) arranged at the open ends of the cylindrical portion 14. The closure cap 16 extends from a transition region 18 (also referred to as "equator"), at which the cylindrical portion 14 transitions into the respective closure cap 16 (here tangentially), to a pole 20, at which the closure cap 16 intersects a longitudinal central axis X which is defined by the cylindrical portion 14.

A fluid connection 22 is arranged at the pole 20 of the closure cap 16 shown in FIG. 1, via which connection fluid can be introduced into or discharged from the pressure tank 10 or the liner 12.

A first plurality of slivers 24 is arranged on the liner 12 of the pressure tank 10, which slivers are shown free in the region I for improved understanding. The slivers of the first plurality of slivers 24 each begin at a longitudinal starting position S1 with respect to the central axis X, which is located here in the region of the cylindrical portion 14, and end at a longitudinal end position E1, which is located here in the region of the closure cap 16. In this case, the slivers of the first plurality of slivers 24 extend from bottom right to top left in the view shown in FIG. 1. In other words, the slivers of the first plurality of slivers 24 extend towards the pole 20 in a counterclockwise rotational direction in FIG. 1.

In the region II, which is shown in FIG. 1, a second plurality of slivers 26 is shown free (i.e. without the first plurality of slivers 24) by way of example. The slivers of the second plurality of slivers 26 extend analogously to the slivers of the first plurality of slivers 24 from a respective starting position S2, which corresponds here to the starting position S1, to a respective end position E2, which corresponds here to the end position E1. However, the slivers of the second plurality of slivers 26 extend in a rotational direction opposite to the rotational direction of the slivers of the first plurality of slivers 24, i.e. from bottom left to top right in FIG. 1. In other words, the slivers of the second plurality of slivers 26 extend towards the pole 20 in a clockwise rotational direction in FIG. 1.

In the region III shown in FIG. 1, the way in which, here, the second plurality of slivers 26 (in the sense of an "offset belt") are superimposed on the first plurality of slivers 24 (in the sense of a "base belt") radially to the outside is shown, the underlying first plurality of slivers 24 being indicated for illustration.

Here, the slivers of the second plurality of slivers 26 have the same, but negative, angle with respect to the slivers of the first plurality of slivers 24, in each case viewed at the same longitudinal position on the pressure tank 10. It may therefore be advantageous, when producing a pressure tank 10 according to the invention, to first arrange the first plurality of slivers 24 completely all around in the peripheral direction of the liner 12, before the second plurality of slivers 26 is applied radially outside thereof.

Figure 2:
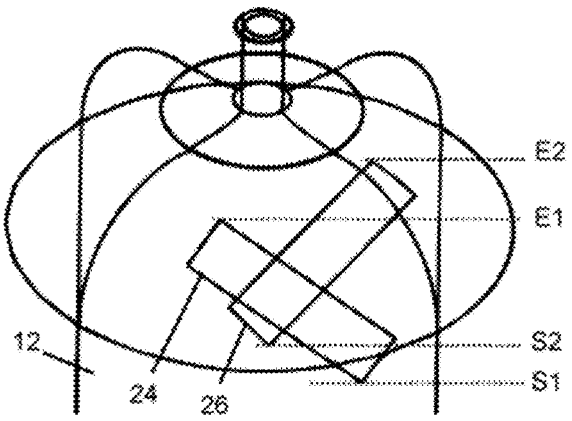
FIG. 2 shows an example of a relative arrangement of slivers.

In FIG. 2, a sliver of the first plurality of slivers 24 and a sliver of the second plurality of slivers 26 are shown by way of example. As already described with reference to FIG. 1, the sliver 26 overlaps the sliver 24. However, in contrast to the arrangement according to FIG. 1, here the longitudinal starting position S2 of the sliver 26 is offset relative to the longitudinal starting position S1 of the sliver 24 in such a way that the longitudinal starting position S2 of the sliver 26 is located closer to the pole 20 than the longitudinal starting position S1 of the sliver 24. On account of the same lengths of the two slivers, as shown in FIG. 2, similar applies for the longitudinal end positions E1 and E2. The longitudinal distance between the starting positions S1 and S2 can in particular correspond to a width or half a length of a sliver 24 and 26, respectively.

Figure 3:
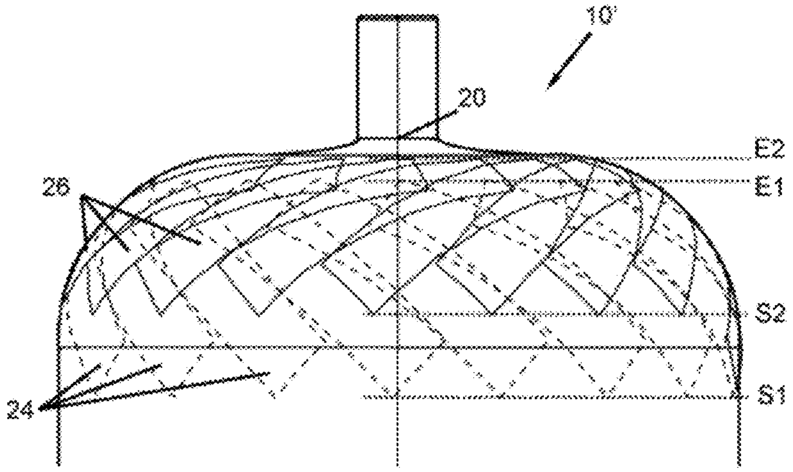
FIG. 3 is a schematic view of a pressure tank which is reinforced according to the relative arrangement of slivers from FIG. 2.

In FIG. 3 a pressure tank 10' is shown, of which the slivers of the first plurality of slivers 24 and the second plurality of slivers 26 have been applied to the liner 12 according to the arrangement described with reference to FIG. 2. This offset arrangement of the starting positions S1 and S2 or of the end positions E1 and E2 makes it possible for a more uniform reinforcement of the liner 12, in particular the closure cap 16, to be achieved. Since FIG. 3 is a schematic, perspective view of a three-dimensional body, the positions S1, S2, E1, E2 migrate upwards to the side edges of FIG. 3.

Figure 4:
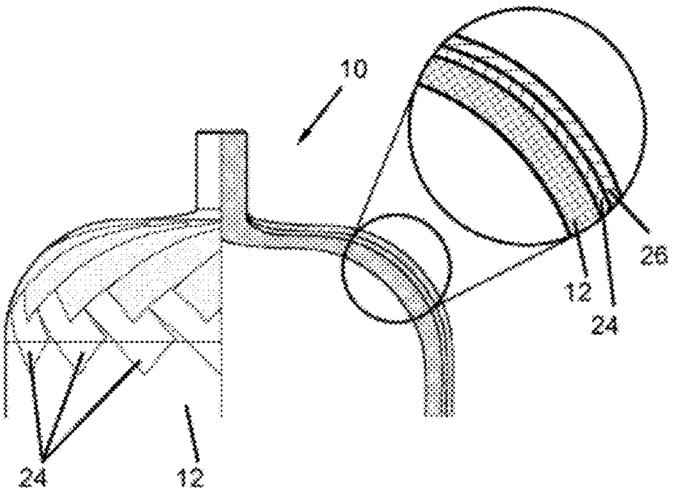
FIG. 4 is a partial sectional view of the pressure tank according to FIG. 3.

FIG. 4 is intended to again illustrate, in this connection, the way in which the second plurality of slivers 26 is superimposed on the first plurality of slivers 24, on the outside thereof. In this way, a first layer is formed on the outside of the liner 12, which layer comprises the first plurality of slivers 24, and a second layer is formed on the outside of the first layer, which comprises the second plurality of slivers 26. Thus, when the start and end points of the slivers and the dimensions and overlaps of the slivers are selected appropriately, it is possible to achieve, viewed in the respective normal direction to the liner surface, arrangement of the first layer at a first distance from the liner 12 and arrangement of the second layer, in particular completely, at a second distance from the liner 12, the second distance being greater than the first distance.

Figure 5:
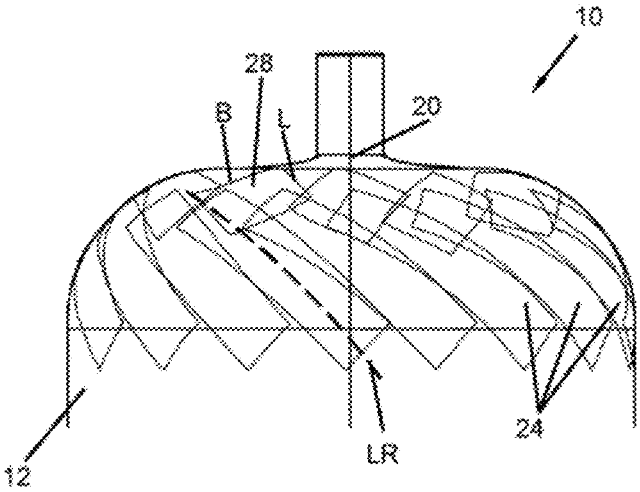
FIG. 5 shows a further arrangement, by way of example, of slivers on a liner of a pressure tank according to the invention.

FIG. 5 shows, using the example of the first plurality of slivers 24, that a following sliver 28 can adjoin the first plurality of slivers 24 (as the "preceding" sliver), in the longitudinal extension direction LR of a respective sliver. In the embodiment shown in FIG. 5, a following sliver 28 has a smaller length L, but a greater width B, than a respective preceding sliver of the first plurality of slivers 24. In this way, the following slivers 28 can be adapted to the greater curvature of the closure cap 16. Furthermore, the number of following slivers 28, viewed in the peripheral direction of the liner 12, can be reduced compared with the plurality of slivers 24. In this way, too, an offset of the longitudinal outside edges of the following slivers 28 relative to the longitudinal outside edges of the slivers of the first plurality of slivers 24 can be achieved, as a result of which reinforcement regions that are less resistant to loads can be reduced.

Figure 6:
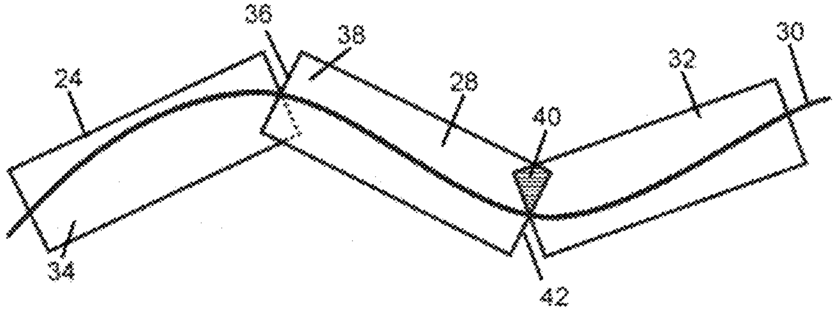
FIG. 6 shows a lining up, by way of example, of slivers.
Figure 7:
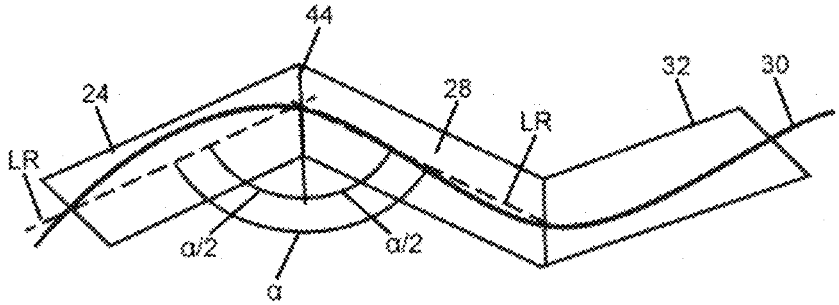
FIG. 7 shows an alternative lining up of slivers compared with FIG. 5.

FIGS. 6 and 7 now show the way in which a following sliver 28 can be arranged relative to a preceding sliver 24, when a change in course direction from the preceding sliver 24 to the respective following sliver 28 is intended to be achieved. In this case, FIGS. 6 and 7 show a gradient line 30, which for example corresponds to a load progression of a component to be reinforced. Said load progression can for example be based on a computer simulation, in which simultaneous loads are applied to a component, for example a pressure tank. Consequently, it may be desirable to align the longitudinal extension directions of respective slivers on the gradient line 30.

In this case, in FIG. 6 the approach is followed of a respective sliver 24, 28, 32 being aligned in such a way that the gradient line 30 enters centrally at a short side of a sliver (side 34 of the sliver 24) and exits again centrally at an opposite short side 36. That is to say that the outside edge is bisected, at a respective short side 34, 36 of a sliver, by the gradient line 30. A respective following sliver 28 is aligned relative to the gradient line 30 under the same properties described above, in addition the entry point of the gradient line 30 into a short side 38 of the sliver 28 coinciding with the exit point of the gradient line 30 out of the short side 36 of the sliver 24. A further sliver 32 following the sliver 28 is arranged in an analogous manner.

As can be seen in FIG. 6, such an arrangement of the slivers 24, 28, 32 results in regions 40 at which adjacent slivers overlap, and regions 42 at which mutually adjacent slivers are spaced apart from one another.

In order to prevent regions 40 that overlap in an undesired manner and/or regions 42 that are spaced apart from one another in an undesired manner from occurring during the arrangement of the slivers on the liner 12, the slivers can be arranged according to the manner shown in FIG. 7. In this case, the alignments of the respective slivers can again be planned in advance on the basis of a computer simulation. If the relative alignment of a preceding sliver 24 with respect to a following sliver 28 (or 28 to 32) is defined, then an angle $\alpha$ can be determined, which angle the two longitudinal extension directions LR of the preceding sliver 24 and of the following sliver 28 span relative to one another. In the event of it being desirable for an abutting edge 44, at which the preceding sliver 24 and the following sliver 28 adjoin one another, to extend along an angle bisector of the angle $\alpha$, then an intersection line 46 (see FIG. 8), according to which a respective sliver is cut out of an original fiber strip 48 (see FIG. 8), is to be aligned in such a way that the angle between the intersection line 46 and the longitudinal extension direction LR of said sliver is $\alpha/2$.

Figure 8:
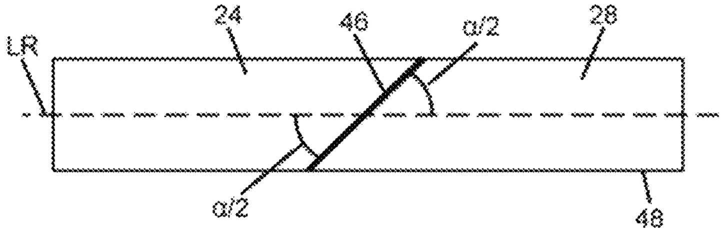
FIG. 8 shows a fiber strip from which the first and the second sliver according to FIG. 7 can be taken.

FIG. 8 shows, as discussed above, that a preceding sliver 24 and a following sliver 28 can be cut out of a fiber strip 48 in such a way that the slivers 24 and 28 shown in FIG. 7 result, without in this case producing unusable waste. For arranging the slivers 24 and 28 produced according to FIG. 8, one of said slivers is to be rotated in such a way that the two angles $\alpha/2$ between the cutting edge and the respective longitudinal extension direction LR supplement one another to form the desired angle $\alpha$ (see FIG. 7).

The invention claimed is:

1. A pressure tank which is designed to store a pressurized fluid, the pressure tank comprising:

a liner, which comprises a cylindrical portion-and a closure cap on axial ends thereof, wherein a central axis is defined by the cylindrical portion, wherein an intersection point of the central axis with closure cap defines a pole of the closure cap, wherein a first plurality of slivers is arranged on an outside of the liner, which slivers are arranged relative to one another, along a peripheral direction of the liner, in such a way that mutually adjacent slivers begin at an identical longitudinal starting position, follow an identical rotational direction with respect to the peripheral direction of the liner and at an identical angle with respect to the longitudinal direction of the liner, and end at an identical longitudinal end position, wherein the respective end position is located closer to a pole associated with the first plurality of slivers than the respective starting position, wherein a second plurality of slivers is arranged on an outside of the first plurality of slivers, which slivers of the second plurality are arranged relative to one another, along the peripheral direction of the liner, in such a way that mutually adjacent slivers begin at an identical longitudinal starting position, follow an identical rotational direction with respect to the peripheral direction of the liner and at an identical angle with respect to the longitudinal direction of the liner, and end at an identical longitudinal end position, wherein the respective end position is located closer to the pole associated with the first plurality of slivers than the respective starting position, wherein the first plurality of slivers and the second plurality of slivers overlap at least in part, and wherein the rotational direction followed by the first plurality of slivers is opposite the rotational direction followed by the second plurality of slivers, wherein the first plurality of slivers is attached to the liner as a ring extending in the peripheral direction of the liner.

2. The pressure tank according to claim 1, wherein the first plurality of slivers forms a peripherally uniform strip pattern of oblique strips.

3. The pressure tank according to claim 1, wherein the first plurality of slivers produces a surface that is closed when viewed in the peripheral direction of the liner.

4. The pressure tank according to claim 3, wherein the second plurality of slivers creates a surface that is closed when viewed in the peripheral direction of the liner and externally covers at least part of the surface created by the first plurality of slivers.

5. The pressure tank according to claim 4, wherein the surface created by the second plurality of the slivers externally covers the surface created by the first plurality of slivers to at least 90%.

6. The pressure tank according to claim 1, wherein the first plurality of slivers, or the first plurality of slivers with the exception of overlap regions of adjacent slivers of the first plurality of slivers, when viewed in a direction along a respective normal to a surface of the liner, is arranged at a first distance from the surface of the liner, and wherein the second plurality of slivers, or the second plurality of slivers with the exception of overlap regions of adjacent slivers of the second plurality of slivers, when viewed in a direction along the same respective normal to the surface of the liner, is arranged at a second distance from the surface of the liner, the first distance being smaller than the second distance.

7. A pressure tank which is designed to store a pressurized fluid, the pressure tank comprising:

a liner, which comprises a cylindrical portion-and a closure cap on axial ends thereof, wherein a central axis is defined by the cylindrical portion, wherein an intersection point of the central axis with closure cap defines a pole of the closure cap, wherein a first plurality of slivers is arranged on an outside of the liner, which slivers are arranged relative to one another, along a peripheral direction of the liner, in such a way that mutually adjacent slivers begin at an identical longitudinal starting position, follow an identical rotational direction with respect to the peripheral direction of the liner and at an identical angle with respect to the longitudinal direction of the liner, and end at an identical longitudinal end position, wherein the respective end position is located closer to a pole associated with the first plurality of slivers than the respective starting position, wherein a second plurality of slivers is arranged on an outside of the first plurality of slivers, which slivers of the second plurality are arranged relative to one another, along the peripheral direction of the liner, in such a way that mutually adjacent slivers begin at an identical longitudinal starting position, follow an identical rotational direction with respect to the peripheral direction of the liner and at an identical angle with respect to the longitudinal direction of the liner, and end at an identical longitudinal end position, wherein the respective end position is located closer to the pole associated with the first plurality of slivers than the respective starting position, wherein the first plurality of slivers and the second plurality of slivers overlap at least in part, and wherein the rotational direction followed by the first plurality of slivers is opposite the rotational direction followed by the second plurality of slivers, and wherein the longitudinal starting position at which the second plurality of slivers begins is located closer to the pole associated with the first plurality of slivers than the longitudinal starting position of the first plurality of slivers.

8. The pressure tank according to claim 7, wherein the longitudinal starting position at which at least the first plurality of slivers begins is arranged in the region of the cylindrical portion of the liner.

9. The pressure tank according to claim 7, wherein a longitudinal offset by which the longitudinal starting position at which the second plurality of slivers begins is closer to the pole associated with the first plurality of slivers than the starting position of the first plurality of slivers corresponds to a width or half a length of a sliver of the first plurality of slivers.

10. The pressure tank according to claim 7, wherein a length of the slivers of the first plurality of slivers is the same as a length of the slivers of the second plurality of slivers.

11. The pressure tank according to claim 7, wherein a respective following sliver is arranged at an end position of at least one of the slivers of the first and/or second plurality of slivers, a width of the following sliver differing from a-width of the preceding sliver.

12. The pressure tank according to claim 11, wherein the width of the following sliver is greater than the width of the preceding sliver.

13. The pressure tank according to claim 11, wherein a longitudinal extension direction of the following sliver is angled relative to a longitudinal extension direction of a respective preceding sliver.

14. The pressure tank according to claim 13, wherein the following sliver and a respective preceding sliver are arranged relative to one another in such a way that an outside edge of the following sliver intersects with an outside edge of the respective preceding sliver, an intersection point at which two outside edges intersect being located both on a center in a width direction of the following sliver and on a center in the width direction of the preceding sliver.

15. The pressure tank according to claim 13, wherein the following sliver and a respective preceding sliver are arranged relative to one another in such a way that an outside edge of the following sliver intersects with an outside edge of the respective preceding sliver, an intersection point at which the two outside edges intersect being located both at an end of the outside edge of the following sliver and at an end of the outside edge of the preceding sliver.

16. The pressure tank according to claim 7, wherein at least one sliver of the first and/or second plurality of slivers have a trapezoidal basic shape.

17. The pressure tank according to claim 16, wherein the trapezoidal basic shape of at least one sliver is designed in such a way that an axis, which is defined by those outside edges at which a preceding sliver and a sliver following this are aligned relative to one another, in particular at which a preceding sliver and a sliver following this come into contact, bisects an angle of a longitudinal extension direction of the following sliver to a longitudinal extension direction of a respective preceding sliver.

18. The pressure tank according to claim 17, wherein a preceding sliver and a sliver following this are taken from mutually adjacent portions of a sliver starting material originally produced in one piece.

19. The pressure tank according to claim 7, wherein at least one of the slivers comprises carbon fibers and/or aramid and/or glass and/or polyethylene and/or basalt.

20. The pressure tank according to claim 7, wherein at least one of the slivers is pre-impregnated with a matrix material, which connects fibers of a respective sliver, or is impregnated by said matrix material after being arranged on the liner.

* * * * *